(12) United States Patent
Orvegren et al.

(10) Patent No.: US 11,981,241 B2
(45) Date of Patent: May 14, 2024

(54) METHOD FOR DETERMINING A STATUS OF A DUMP BODY ARRANGEMENT

(71) Applicant: VOLVO CONSTRUCTION EQUIPMENT AB, Eskilstuna (SE)

(72) Inventors: Pierre Orvegren, Ingelstad (SE); Martin Nyström, Växjö (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 354 days.

(21) Appl. No.: 17/623,227

(22) PCT Filed: Jul. 2, 2019

(86) PCT No.: PCT/EP2019/067719
§ 371 (c)(1),
(2) Date: Dec. 27, 2021

(87) PCT Pub. No.: WO2021/001024
PCT Pub. Date: Jan. 7, 2021

(65) Prior Publication Data
US 2022/0250526 A1 Aug. 11, 2022

(51) Int. Cl.
*B60P 1/28* (2006.01)
*G01M 13/02* (2019.01)

(52) U.S. Cl.
CPC ............. *B60P 1/283* (2013.01); *G01M 13/02* (2013.01)

(58) Field of Classification Search
CPC ............................... B60P 1/283; G01M 13/02
See application file for complete search history.

(56) References Cited

U.S. PATENT DOCUMENTS

| 3,203,735 | A | 8/1965 | August |
| 2004/0104596 | A1 | 6/2004 | Bender |
| 2012/0301264 | A1 | 11/2012 | Niva |
| 2016/0264032 | A1 | 9/2016 | Terada et al. |

FOREIGN PATENT DOCUMENTS

| CN | 102029934 A | 4/2011 |
| CN | 205706328 U | 11/2016 |
| CN | 206202072 U | 5/2017 |

(Continued)

OTHER PUBLICATIONS

Machine Translation of Akino's reference (JP-2013164396-A) (Year: 2013).*

(Continued)

*Primary Examiner* — Tarek Elarabi
(74) *Attorney, Agent, or Firm* — Sage Patent Group (57) ABSTRACT

The disclosure relates to a method for determining a status of an intermediate support of a dump body arrangement included in a working machine, the dump body arrangement including a support frame, a dump body for receiving a load and pivotally attached to the support frame at a rear pivot point, a hydraulic support for raising and lowering a front part of the dump body, wherein the intermediate support is arranged between the hydraulic support and the rear pivot point to support the dump body, wherein the method includes the steps of receiving a signal indicating that the hydraulic support changes between a load-free state and a loaded state relative the dump body.

14 Claims, 2 Drawing Sheets

(56) References Cited

FOREIGN PATENT DOCUMENTS

| CN | 109228996 A | | 1/2019 | | |
|---|---|---|---|---|---|
| EP | 2364877 A1 | * | 9/2011 | ............. | B60P 1/283 |
| EP | 3372425 A1 | | 9/2018 | | |
| GB | 2537591 A | * | 10/2016 | ............. | B60P 1/283 |
| JP | 2007331677 A | | 12/2007 | | |
| JP | 2013121762 A | | 6/2013 | | |
| JP | 2013164396 A | * | 8/2013 | ............. | B60P 1/283 |
| WO | WO 2013/122066 A1 | | 8/2013 | | |

OTHER PUBLICATIONS

Machine Translation of Meissner's reference (EP-2364877-A1) (Year: 2011).*

International Search Report and Written Opinion of the International Searching Authority, PCT/EP2019/067719, dated Mar. 31, 2020, 17 pages.

Chinese Office Action and English Summary, Chinese Application 201980098066.X, dated Mar. 31, 2023, 13 pages.

* cited by examiner

METHOD FOR DETERMINING A STATUS OF A DUMP BODY ARRANGEMENT

CROSS REFERENCE TO RELATED APPLICATIONS

This application is a 35 U.S.C. § 371 national stage application of PCT International Application No. PCT/EP2019/067719 filed on Jul. 2, 2019, the disclosure and content of which is incorporated by reference herein in its entirety.

TECHNICAL FIELD

The invention relates to a method for determining a status of an intermediate support of a dump body arrangement comprised in a working machine. The invention also relates to a dump body arrangement comprising a control unit for determining a status of an intermediate support of the dump body arrangement. Moreover, the invention relates to a working machine comprising such dump body arrangement. The invention is applicable on vehicles, in particular working machines within the fields of industrial construction machines or construction equipment, such as articulated haulers. Although the invention will mainly be described in relation to an articulated hauler, it may also be applicable for other types of vehicles and working machines such as e.g. dump trucks, wheel loaders and the like.

BACKGROUND

During construction and excavation for transporting heavy loads from one point to another, e.g. at construction sites or the like, working machines such as load carrying machines, including articulated haulers, are commonly employed. By way of example, these load carrying machines may be utilized for transportations in connection with road or tunnel building, sand pits, mines, forestry and similar environments. Thus, the articulated haulers are frequently operated with large and heavy loads in rough terrain and on slippery ground where no regular roads are present. Further, these articulated haulers typically comprise a body for holding and transporting material, often known as a dump body, which can be raised relative to a part of a chassis of the articulated hauler and tipped about a pivot point to empty any material held therein as a means for dispersing the material. To this end, the dump body is generally pivotally attached to a support frame of the chassis at a rear pivot point, in which the dump body and the support frame can be seen to form a dump body arrangement for the working machine.

The dump body may be controlled to move between a fully raised position and a fully lowered position resting upon the support frame of the chassis. Such operation is typically performed by means of one or more actuators operable by a user of the articulated hauler in response to the desired operation of the dump body.

For reasons of efficient and enduring transportation of loads, the dump body and, in particular, the support frame for such machines should be dimensioned to withstand both static maximal loads and dynamic factors to which the machine will be exposed while working with the articulated hauler. In order to support the dump body when it is in a rest position relative the support frame and in a non-loaded state, i.e. when there is no payload in the dump body, some chassis may have one or several shock-absorbing pads (buffers) arranged along the support frame. Thus, in addition to the rear pivot point connection, the support frame may have a number of supports arranged on a top surface thereof facing the dump body. The supports can be arranged both longitudinally and transversely relative the extension of the dump body in order to provide for an improved distribution of forces between the dump body and the chassis of the articulated hauler. By way of example, such supports may be made of rubber or any other suitable materials, and are generally regarded as fairly simple parts of the dump body arrangement.

Together with the rear pivot point connection, these types of supports for the dump body constitute contact points between the dump body and the support frame for the dump body, i.e. the contact points define load transferring interfaces such that forces can be distributed from the dump body to the support frame, and further to the pair of wheels of the articulated hauler. Due to the heavy loads in the dump body and frequent lifting and lowering operations of the dump body relative the chassis, it is not unlikely that deformations of the dump body and other components of the dump body arrangement may arise over time. Hence, there is a continuous need for service and maintenance of the dump body arrangement. Further, in order to keep the maintenance costs at an appropriate level, there is an increasing demand for improved monitoring of the status of the components making up the dump body arrangement.

In view of the various forces transmitted from the dump body to the chassis during ordinary use of the working machine and the dump body arrangement, it would be desirable to improve controllability of the load transferring interfaces between the components making up the dump body arrangement.

SUMMARY

It is an object of the present invention to provide a method for determining a status of an intermediate support arranged to support a dump body of a working vehicle, such as a status indicative of the wear of the intermediate support of the working machine. The object is at least partly achieved by a method according to claim 1.

According to a first aspect of the present invention, there is provided a method for determining a status of an intermediate support of a dump body arrangement comprised in a working machine. The dump body arrangement comprises a support frame, a dump body for receiving a load and pivotally attached to the support frame at a rear pivot point, a hydraulic support for raising and lowering a front part of the dump body. Moreover, the intermediate support is arranged between the hydraulic support and the rear pivot point to support the dump body.

The method comprises the steps of:
  receiving a signal indicating that the hydraulic support changes between a load-free state and a loaded state relative the dump body;
  if the hydraulic support changes from the loaded state to the load-free state relative the dump body, determining, when the hydraulic support is in the load-free state, an angle of the dump body relative the support frame; and/or
  if the hydraulic support changes from the load-free state to the loaded state relative the dump body, determining, when the hydraulic support is in the loaded state, any one of an angle of the dump body relative the support frame and a hydraulic pressure in the hydraulic support; and determining the status of the intermediate support by comparing any one of the determined angles and the determined hydraulic pressure with a corresponding threshold.

In this manner, it becomes possible to determine the status of the intermediate support by making use of an existing front hydraulic support together with data indicative of the position of the dump body relative the support frame and/or data indicative of the hydraulic pressure in the hydraulic support. In other words, the method according to the example embodiments provides for initiating and performing a test sequence with the aim to evaluate the status of the intermediate support and to identify any type of wear of the intermediate support.

As such, the method according to the example embodiments provides for monitoring that loads are transferred from the dump body to the support frame in an appropriate manner and for monitoring that the distribution of the forces in the arrangement is not altered over time because of a change in the load capability of the intermediate support. Typically, the transfer of the loads between the dump body and the support frame should be distributed according to the original design intent of the working machine. Hence, the method may also permit for determining and confirming that loads are transferred from the dump body to the support frame according to the original design intent of the working machine.

The present invention is at least partly based on the observation that utilization of the working machine over time eventually leads to deterioration of the supports arranged between the dump body and the support frame of the dump body arrangement due to wear and creep of the components making up the arrangement. Therefore, the distribution of forces between the supports arranged along the support frame may differ in properties as compared to the original status of the supports, i.e. a status in which the supports were unaffected by wear and creep. Further, as the supports generally are made of rubber, sometimes steel reinforced, the impact from wear and creep can be rather devastating for the overall performance of the arrangement. Therefore, load transfer paths from the dump body to the support frame and the wheels of the working machine may change significantly as the working machine is operated e.g. at construction site.

While also front supports may be subjected to wear, a dump body arrangement is generally designed such that a great part of the forces arising due to the dump body load should be transferred through the intermediate support and to the ground (via the wheels). If the intermediate support cannot provide adequate support to the dump body, a greater portion of the load will be transferred via the front supports, giving rise to a completely different load case for the dump body arrangement. By way of example, the portion of the dump body load not being transferred via the intermediate support to the support frame will rather be carried by the front support(s) and the rear pivot connection, implying that the total bending moment of the support frame may increase. Accordingly, substantial wear of the intermediate support(s) may cause a more severe total load case for the support frame and chassis of the working machine as compared to if the supports were unaffected.

Wear of the intermediate support may, at least within a certain limit, be compensated for by having hydraulic supports as front supports. By way of example, the hydraulic support can be lowered until the intermediate support carries its necessary share of the dump body load. However, when the wear of the intermediate support can no longer be compensated for by the hydraulic front supports, the intermediate support may need to be replaced or at least undergo service.

By providing a dump body arrangement according to the example embodiments, which combines the characteristics and the controllability of the hydraulic support to determine the status of the intermediate support, it becomes possible to implement a certain degree of intelligence in the arrangement.

In particular, by the provision of determining an angle of the dump body relative the support frame, when the hydraulic support is in the load-free state, it becomes possible to determine at which angle the force exerted on the hydraulic support (front support) becomes zero, i.e. when the hydraulic support changes to the load-free state. Such data indicating that no force is exerted on the hydraulic support is subsequently used as input to decide the status of the intermediate support by comparing the determined angle and with a corresponding threshold. Accordingly, such configuration of the method makes use of information that the front support is in an unloaded state relative the dump body to determine if the status of the intermediate support is acceptable/non-acceptable. For example, if the (front) hydraulic support is required to be lowered too much to provide a proper load relief such that forces/loads are transferred via the intermediate support to the support frame, it may indicate that the intermediate support does not fulfill the desired or given requirements of the dump body arrangement. In order to decide whether the status of the intermediate support is acceptable or non-acceptable, the determined angle is compared with the threshold.

Analogously, by the provision of determining any one of an angle of the dump body relative the support frame and a hydraulic pressure in the hydraulic support, when the hydraulic support is in the loaded state, it is possible to determine at which angle or at which hydraulic pressure the force exerted on the hydraulic support (front support) changes (increases) due a contact with the empty dump body, i.e. when the hydraulic support changes to the loaded state. Such data indicating that a force is exerted on the hydraulic support is subsequently used as input to decide the status of the intermediate support by comparing any one of the determined angle and the determined hydraulic pressure with a corresponding threshold. Accordingly, such configuration of the method makes use of information that the front support is in a loaded state relative the dump body to determine if the status of the intermediate support is acceptable/non-acceptable.

The example embodiments of the method may also contribute to minimize pulse loads to which the operator, load carrying structure as well as sensitive equipment are subjected to during loading. That is, the example embodiments of the method may provide for minimizing excessive pulse loads arising due to e.g. stone drop into the dump body.

Excessive pulse loads may be minimized by e.g. controlling the hydraulic pressure in the hydraulic support in response to the determined status of the intermediate support.

The example embodiments of the method may also contribute to minimize the dynamic excitation of the dump body and effects thereof (e.g. rattle and severe duty) as arising during unladen high speed travel. Dynamic excitation of the dump body may be minimized by e.g. controlling the hydraulic pressure in the hydraulic support in response to the determined status of the intermediate support, while also taking the weight of the load and the speed of the working machine into consideration.

In the context of the example embodiments of the method, the hydraulic support is an active dump body support arranged to permit a transfer of load from the dump body to the support frame of the working machine. The hydraulic support is generally arranged between the support frame and the dump body in a longitudinal direction of the dump body arrangement. Further, the hydraulic support is typically arranged at a front region of the support frame and arranged to the front part of the dump body. By the provision of having a hydraulic support arranged in a front of the dump body arrangement, it becomes possible to monitor and secure a proper load transfer from the dump body to the support frame over time. The hydraulic support is arranged to provide support for a lower part of the dump body. Thus, the hydraulic support may have an upper surface for supporting a lower part of the dump body. In other words, the hydraulic support is neither fixedly connected nor fixedly arranged to the dump body.

Furthermore, the provision of using a hydraulic support provides for altering the behavior of the front support(s) of the dump body arrangement in response to prevailing conditions, which may typically have a positive impact on the load transfer from the dump body to the support frame. By way example, the hydraulic support is a hydraulic cylinder containing a fluid liquid medium such as oil or the like. Such types of hydraulic supports allow for an improved controllability and flexibility compared to other types of supports. In particular, the hydraulic support may be operable in response to the current load support situation i.e. loading of material in the dump body, travel-laden, travel-unladen etc. In this manner, the hydraulic support is adapted to alter its behavior in dependence of the operational situation of the dump body arrangement.

Typically, the status of the intermediate support is indicative of the wear of the intermediate support. Hence, according to one example embodiment, the method further comprises the step of determining that the intermediate support is exposed to excessive wear if any one of the determined angles and determined hydraulic pressure of the hydraulic support is above the corresponding threshold.

In this context, the term "wear" may refer to an expected wear due to a deteriorating process of the intermediate support over time as well as if the intermediate support would unexpectedly be damaged for some reasons. Further, the term "wear" may indicate different types of wear, including, but not limited to, mechanical wear of the intermediate support, wear due to traction, wear due to compression, wear due to heavy loads implying cracks within the intermediate support, creeps etc.

In one example embodiment, the method determines the status of the intermediate support only based on the determined angle of the dump body relative the support frame when the hydraulic support is in the load-free state relative the dump body. Determining the status of the intermediate support by only determining the angle of the dump body relative the support frame may provide for a simple and inexpensive configuration for some types of working machines.

In one example embodiment, the method determines the status of the intermediate support only based on the determined angle of the dump body relative the support frame when the hydraulic support is in the loaded state relative the dump body. Determining the status of the intermediate support by only determining the angle of the dump body relative the support frame may provide for a simple and inexpensive configuration for some types of working machines.

In one example embodiment, the method determines the status of the intermediate support only based on the determined hydraulic pressure in the hydraulic support. Determining the status of the intermediate support by only determining the hydraulic pressure in the hydraulic support may provide for a simple and inexpensive configuration for other types of working machines.

However, it is also possible that the status of the intermediate support is determined based on a combination of any one the determined angles of the dump body relative the support frame and the determined hydraulic pressure in the hydraulic support. Such configuration may provide for an improved accuracy in determining the status of the intermediate support.

The threshold can be defined in several manners and may contain any one of a static value and dynamic value. The threshold may be a predetermined value. The predetermined value may be stored in a control unit. However, the threshold value may also be a value determined by the user of the working machine. Such value may also be updated based on various internal and external changes. By way of example, the threshold may be set at static equilibrium and unladen conditions by extracting a pressure range of the hydraulic pressure in the hydraulic support associated with an acceptable status or wear of the intermediate support.

In an example when the method is performed to determine the hydraulic pressure, a too high hydraulic pressure under unladen conditions may indicate that the intermediate support does not work as intended. Likewise, in an example when the method is performed to determine the angle, a too high angle under unladen conditions may indicate that the intermediate support does not work as intended.

By way of example, the step of determining any one of the angles of the dump body relative the support frame comprises the step of receiving data indicating a corresponding value of the angle.

The value of the angle may be determined in several different manners. According to one example embodiment, the value of the angle is determined by an angle sensor arranged at the rear pivot point. In this manner, it may be possible to make use of an already installed component in the dump body arrangement for determining the status of the intermediate support, as some types of working machines use an angle sensor for other reasons.

In addition, or alternatively, the value of the angle is determined from data containing the height of the hydraulic support as measured when the hydraulic support is in the load-free state. In addition, or alternatively, the value of the angle is determined from data containing the height of the hydraulic support as measured when the hydraulic support is in the loaded state. In this manner, a value of the angle in the load-free state of the dump body is determined by measuring the height of the hydraulic support by determining at which height of the hydraulic support there is no contact between the intermediate support and the dump body and a value of the angle in the loaded state of the dump body is determined by measuring at which height the hydraulic support carries a certain load corresponding to the load of the dump body.

Generally, although strictly not required, the movement of the hydraulic support is restricted in extent to avoid that load contained in the dump body is dispersed from the dump body. It is to be noted that the hydraulic support is generally a separate hydraulic cylinder of the dump body arrangement than the hydraulic system for tilting the dump body into a material dispersing position. Further, in one example embodiment, the hydraulic support is arranged between the dump body and the support frame in a vertical direction.

The intermediate support is generally arranged longitudinally in-between the hydraulic support and the rear pivot point. In addition, the intermediate support is generally arranged between the dump body and the support frame in the vertical direction.

According to one example embodiment, the intermediate support is arranged longitudinally adjacent and substantially vertically above a rear axle of the working machine.

Typically, the hydraulic support is in the load-free state, i.e. a non-loaded state relative the dump body, when there is no payload in the dump body, i.e. the dump body is empty and when the hydraulic support is not subjected to the load of the dump body itself. The term "load-free state" as used herein, thus typically refers to a state of the hydraulic support, in which the hydraulic support is not exposed to a load from the dump body. Generally, the load-free state also means that the hydraulic support is not in contact with the dump body. The load-free state may typically be derivable by comparing the load affecting the hydraulic support with the deadweight of the dump body. When the load affecting the hydraulic support is less than the deadweight of the dump body, the hydraulic support is generally positioned in a load-free state relative the dump body. If the deadweight is known in beforehand, such value can be used in the step of determining the load-free state. If the deadweight is not known in beforehand, the load-free state may also be determined by measuring the total weight of the dump body and any payload in the dump body, and the comparing the load affecting the hydraulic support with the total weight of the dump body and any payload in the dump body. Accordingly, the method may include a step of determining when the hydraulic support is in the load-free state. By way of example, the load-free state may be defined to correspond to a given weight interval of the dump body. If the hydraulic support is not in a load-free state, the hydraulic support may generally be lowered into a load-free state relative the dump body by controlling the hydraulic support as is commonly known in the art.

Analogously, the term "loaded state", as used herein, refers to a state of the hydraulic support in which there is no contact between the hydraulic support and the dump body. That is, the hydraulic support is in a non-supporting state relative the dump body.

According to one example embodiment, the method further comprises the step of providing a need-to-service indication to an operator if any one of the determined angles and determined hydraulic pressure of the hydraulic support is above the corresponding threshold. By way of example, the need-to-service indication may be transferred to a control unit and further to the operator of the working machine. Thus, by means of indicating a need-of-service for the intermediate support, it becomes possible to secure that load transfer from the dump body to the support frame of the dump body arrangement will correspond to the design intent of the working machine.

According to one example embodiment, the method further comprises the steps of monitoring the hydraulic pressure in the hydraulic support and indicating a dump body overload if the monitored hydraulic pressure exceeds another (second) threshold. Hence, the example embodiments of the method may also allow for alerting the operator of the working machine in cases of a dump body overload. Dump body overload, or machine overload, can be indicated by making use of information received from the hydraulic support, e.g. an indication of the magnitude of the hydraulic pressure, an indication that the force exerted on the hydraulic support has exceeded a pre-defined limit etc.

According to one example embodiment, the method further comprises the step of lowering the hydraulic support until the hydraulic pressure in the hydraulic support is within a permissible hydraulic pressure range.

Optionally, although strictly not required, the method may further take data such as the working machine speed and the magnitude of the force in the hydraulic support into consideration to identify unladen high speed travel and to adjust properties of the hydraulic supports to meet the demands for a given operational situation. By way of example, the behavior of the hydraulic support can be adapted to a given loading situation (including an adjustment of the forces, strokes, damping capabilities of the hydraulic support).

It should be readily appreciated that a step of changing the status of the hydraulic support between the load-free state and the loaded state may precede the step of receiving a signal indicating that the hydraulic support changes between a load-free state and a loaded state relative the dump body. Changing status of the hydraulic support may typically be performed by either raising the hydraulic support in contact with the dump body or lowering the hydraulic support away from the dump body until there is no contact between the hydraulic support and the dump body.

The steps of the method may typically be performed by a control unit, such as an electronic control unit of the working machine. Thus, in one example embodiment, the dump body arrangement further comprises a control unit arranged in communication with the working machine, the control unit being configured to perform any one of the steps of the method. Alternatively, the control unit is comprised in the working machine at another location, while being arranged in communication with the components of the dump body arrangement to perform any one of the steps of the method. The control unit may even be arranged remote from the working machine, while being arranged in communication with the working machine to perform any one of the steps of the method.

It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. A software executed by the control unit for operation in accordance to the example embodiments may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Further, the control unit may comprise one or more sub-control units in communication with each other. Also, by way of example, the control unit may be, or form part of, already existing control units for controlling the articulated hauler or parts of the articulated hauler.

According to a second aspect of the present invention, there is provided a computer program comprising program code means for performing the steps described above in relation to the first aspect of the present invention when the program is run on a computer.

According to a third aspect of the present invention, there is provided a computer readable medium carrying a computer program comprising program means for performing the steps described above in relation to the first aspect of the present invention when the program means is run on a computer.

Effects and features of the second and thirds aspects are largely analogous to those described above in relation to the first aspect of the present invention.

According to a fourth aspect of the present invention, there is provided a dump body arrangement for a working machine, the dump body arrangement comprising a dump body for receiving a load and pivotally attached to a support frame at a rear pivot point, a hydraulic support for raising and lowering a front part of the dump body, an intermediate support for supporting the dump body, the intermediate support being arranged between the hydraulic support and the rear pivot point. Further, the dump body arrangement comprises a control unit, wherein the control unit is configured: to receive a signal indicating that the hydraulic support changes between a load-free state and a loaded state relative the dump body; to determine, if the hydraulic support changes from the loaded state to the load-free state relative the dump body and when the hydraulic support is in the load-free state, an angle $\alpha 1$ of the dump body relative the support frame; and/or to determine, if the hydraulic support changes from the load-free state to the loaded state relative the dump body and when the hydraulic support is in the loaded state, any one of an angle $\alpha 2$ of the dump body relative the support frame and a hydraulic pressure in the hydraulic support; and to determine the status of the intermediate support by comparing any one of the determined angle and the determined hydraulic pressure with a corresponding threshold.

Effects and features of the fourth aspect are largely analogous to those described above in relation to any one of the first aspect, the second aspect and the third aspect of the present invention.

The support frame of the dump body arrangement is arranged to support the dump body in a rest position. In the rest position, the dump body is in contact with the intermediate support and supported by the hydraulic support. As such, the intermediate support is arranged to transfer load from the dump body to the support frame. Analogously, the hydraulic support is adapted to transfer load from the dump body to the support frame.

Typically, the support frame is a part of the chassis of the working machine. By way of example, the support frame is a part of the dump body arrangement, which at least partly is an integral part of the chassis. The support frame may typically also correspond to a so-called frame girder or a load carrying frame etc. If the working machine comprises a cab unit and a trailer unit, the support frame is generally an integral part of the trailer unit. For similar reasons, the dump body arrangement is generally an integral part of the trailer unit.

It should also be noted that it may be enough that the dump body arrangement comprises one single hydraulic support and one single intermediate support. However, the dump body arrangement typically comprises a pair of transverse hydraulic support units forming the hydraulic support and a pair of transverse intermediate support units forming the intermediate support. Analogously, the rear pivot point between the dump body and the support frame may comprise a pair of transfer pivot point connections forming the rear pivot point.

Further, the support frame typically comprises the hydraulic support, the intermediate support and the rear pivot point connection. The hydraulic support, the intermediate support and the rear pivot point connection are thus integral parts of the support member. However, the hydraulic support, the intermediate support and the rear pivot point connection may likewise be separate parts of the dump body arrangement fixedly attached to the support frame. Such parts are generally standard components that may also be exchangeable when damaged or worn out. Typically, the hydraulic support and the intermediate support are arranged on a surface of the support frame that faces the dump body. In other words, the hydraulic support is arranged in-between the support frame and the dump body in the vertical direction of the working machine. Analogously, the intermediate support is arranged in-between the support frame and the dump body in the vertical direction of the working machine.

According to one example embodiment, the dump body may be controlled to move between a first body position, corresponding to a fully raised position, and a second body position, corresponding to a fully lowered position, in which the dump body is arranged to rest upon the support frame of the chassis. Thus, by way of example, the dump body arrangement comprises a hoist device which, when actuated, may raise the dump body from the first body position (e.g. a fully lowered position or a maximum position in a lowering direction) resting on the support frame, and cause the dump body to rotate about the rear pivot point into the second body position (e.g. a fully raised position or a maximum position in a raising direction) at an angle relative to the support frame. As the dump body rotates into the second body position, the dump body may dump and disperse some or all materials or a load from within the dump body. As such, the dump body defines a material dispersal device of the working machine working. The hoist device may be actuated to carry out a reverse operation in which the dump body is lowered from the second body position back to the first body position. The hoist device may be connected between the dump body and the support frame. The dump body arrangement may include at least one hoist device on each side of the dump body relative to a longitudinal axis of the dump body arrangement. The hoist device may be any device, hydraulic, electrical, mechanical, or combination thereof, suitable for raising and lowering the dump body.

According to one example embodiment, the dump body arrangement comprises a rearward axle assembly supporting a boogie arrangement with two load-bearing wheel axles. Each one of the load-bearing wheel axles comprises a pair of wheels. The rearward axle assembly is arranged under the rear part of the support frame. By way of example, the intermediate support is arranged above the rear axle assembly.

According to a fifth aspect of the present invention, there is provided a working machine comprising a dump body arrangement as described above in relation to any one of the aspects of the present invention. One example of a working machine is an articulated hauler. However, the working machine may be any type of vehicle or working machine intended for carrying out an operation according to the example embodiments of the present invention.

Effects and features of the fifth aspect are largely analogous to those described above in relation to any one of the first aspect, the second aspect, the third aspect and the fourth aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
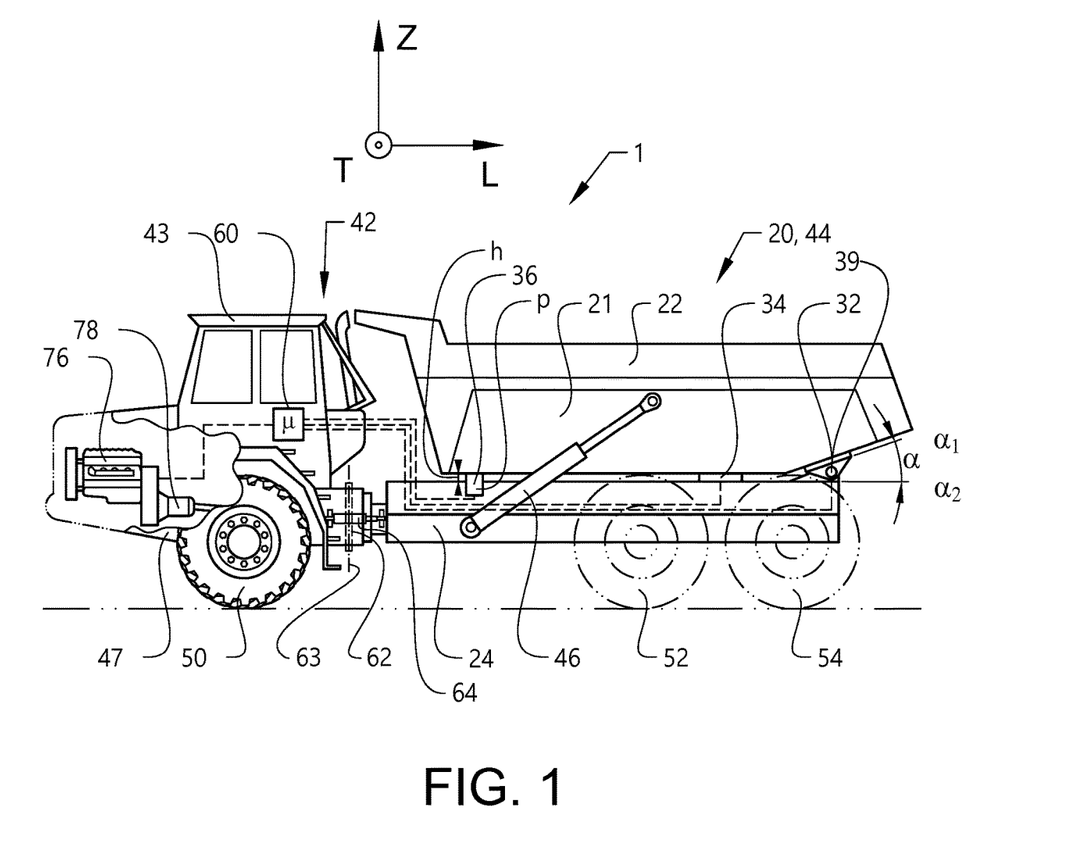
FIG. 1 is a lateral side view illustrating an example of a working machine in the form of an articulated hauler; the working machine comprising a dump body arrangement according to one example embodiment of the present invention.

For the sake of facilitating the understanding of some example embodiments of the invention, the example of the working machine in FIG. 1 is illustrated in the form of an articulated hauler 1, and the following example embodiments of the invention are described based on an exemplary articulated hauler to illustrate the configuration of the example embodiments of the invention. However, such does not mean that the invention will be limited to an implementation of the example embodiments in an articulated hauler. It should also be readily appreciated that throughout the description of the example embodiments of the present invention, the articulated hauler may sometimes be referred to as the vehicle, the working machine or simply as the machine, the hauler, hauler vehicle or the like.

Turning now to FIG. 1, there is depicted an example of a working machine 1 in the form of an articulated hauler. Articulated haulers are commonly employed during construction and excavation for transporting loads from one point to another. These types of machines may comprise a body for holding and transporting material, often known as a dump body, which can be raised relative to a chassis of a machine and tipped about a pivot point to empty any material held therein as a means for dispersing the material. As illustrated in FIG. 1, the articulated hauler 1 comprises a tractor unit 42 with a cab 43 for a driver and a trailer unit 44 in the form of a dump body arrangement 20. The trailer unit 44 has a platform, in the form of a support frame 24, and a dump body 22, here in the form of a container, arranged thereon, for receiving load.

The dump body arrangement 20, and thus the articulated hauler, typically extends in a longitudinal (length) direction L, a transverse (width) direction T and in a vertical (height) direction Z. As shown in FIG. 1, these directions form a conventional coordinate system, i.e. the three coordinate axes are given, each perpendicular to the other two at the origin, the point at which they cross. In other words, the longitudinal direction is perpendicular to the transverse direction. Analogously, the longitudinal direction is perpendicular to the vertical direction. Analogously, the vertical direction is perpendicular to the transverse direction. Further, it should be noted that the terms top, above, upper, upward, below, lower, as well as any other similar terms are used in reference to the position of the dump body arrangement 20 as depicted in the drawings and the arrangement may be positioned and used in other orientations.

The articulated hauler here comprises a number of wheels as ground engaging members. By way of example, the tractor unit 42 has a frame 47 and a pair of wheels 50 suspended from the frame 47. The dump body arrangement 20 (part of the trailer unit 44) has the support frame 24 and two pair of wheels 52, 54 suspended from the support frame 24. By way of example, the two pair of wheels are part of a bogie arrangement, as illustrated in FIG. 1.

The articulated hauler 1 is frame-steered, i.e. there is a joint arrangement 62 connecting the tractor unit 42 and the trailer unit 44 of the articulated hauler 1. The tractor unit 42 and the trailer unit 44 are pivotally connected to each other for pivoting around a substantially vertical pivot axis 63.

The articulated hauler typically comprises a steering hydraulic system having two hydraulic cylinders 64, steering cylinders, arranged on opposite sides of the working machine for turning the working machine by means of relative movement of the tractor unit 42 and the trailer unit 44. The hydraulic cylinders can, however, be replaced by any other linear actuator for steering the machine, such as an electromechanical linear actuator.

Furthermore, the articulated hauler 1 comprises a prime mover 76, here illustrated as an internal combustion engine, and a gearbox 78 having a transmission arrangement configured to obtain a set of gears. These parts of the articulated hauler are well-known and can be provided in several different ways depending on type of vehicle and type of driving condition. As these parts of the vehicle are well-known components, they will not be further described herein.

Referring again to FIG. 1, the dump body 22 is typically pivotally connected to a rear section of the dump body arrangement 20. In this example, the dump body 22 is pivotally attached to a support frame 24 of the dump body arrangement at a rear pivot point 32. The rear pivot point is generally a part of the support frame and may be provided in the form of a hinge assembly, sometimes also referred to as the body hinge. In one example, the rear pivot point comprises an angle sensor 39 for monitoring an angle $\alpha$ of the dump body relative the support frame. The angle $\alpha$ generally refers to the angle between a longitudinal plane of the dump body 22 and a longitudinal plane of the support frame 24. The longitudinal plane extends a substantial part in the longitudinal direction L. While the angle sensor 39 is located at the rear pivot point 32 in the example embodiment in FIG. 1, it may be also be possible to arrange the angle sensor at other locations as long as the angle sensor can be used for determining the relative position between the dump body and the support frame. In other words, the angle sensor is arranged to monitor a change in an angle between the dump body and the support frame. Such change between the dump body and the support frame is generally defined by means of a reference value to determine a position of the dump body relative the chassis by comparing the determined angle with the reference value. By way of example, the angle sensor may be any one of a capacitance sensor, eddy current sensor, photoelectric sensor, ultrasonic sensor.

In a longitudinal front part of the dump body arrangement 20, there is arranged a front support for the dump body 22. Hence, as also illustrated in FIG. 1, the dump body arrangement 20 comprises a hydraulic support 36 for raising and lowering a front part 21 of the dump body 22. The hydraulic support 36 is arranged between the dump body 22 and the support frame 24 in the vertical direction Z. By way of example, the hydraulic support is a conventional hydraulic cylinder. As is commonly in known in the art, a hydraulic support is capable of moving between two end positions. Hence, while referring to FIG. 1, the hydraulic support is controllable to move between a vertical lower position and a vertical raised position. In this manner, the hydraulic support is arranged to change its state relative the dump body between a loaded state and a load-free state. Typically, although not strictly necessary, a movement of the hydraulic support is restricted in extent to avoid that load contained in the dump body is dispersed from the dump body. Moreover, the dump body arrangement 20 here comprises a pressure sensor (although not shown) to monitor a hydraulic pressure p in the hydraulic support. The pressure sensor is typically a sensor configured to measure a hydraulic pressure of the hydraulic support. The sensor is arranged in connection to the hydraulic support. By monitoring the hydraulic pressure in the hydraulic sensor, it becomes possible to monitor the pressure that the dump body exerts on the hydraulic support. The pressure sensor can further be arranged to transmit a signal of the detected pressure to a control unit 60. The signal may e.g. contain information indicative of the load weight in the dump body.

Further, as illustrated in FIG. 1, the dump body arrangement 20 comprises an intermediate support 34. The intermediate support is also arranged to support the dump body 22. In this example, the intermediate support is a rubber pad arranged to support the dump body 22. The intermediate support 34 is typically a so-called shock-absorbing buffer that is configured to be deformed under changes of pressure and subsequently to regain its original form when the pressure is reduced, whereby the dump body still retains a soft support during lifting and lowering operations of the dump body. More specifically, as shown in FIG. 1, the intermediate support is arranged between the hydraulic support 36 and the rear pivot point 32, as seen in the longitudinal direction L of the dump body arrangement. Moreover, the intermediate support 34 is arranged between the dump body 22 and the support frame 24, as seen in the vertical direction Z. While the location of the intermediate arrangement on the support frame may vary for different types of dump body arrangement, the intermediate support is typically arranged in connection with a rear axle(s) of the working machine. By way of example, as shown in FIG. 1, the intermediate support 34 is arranged in-between two rear axles connected to the pair of wheels 52, 54, respectively.

In another example (although not shown), the intermediate support 34 may be arranged longitudinally adjacent and substantially vertically above a rear axle of the working machine. That is, the intermediate support 34 is for example arranged longitudinally adjacent and substantially vertically above the pair of rear wheels 52 of the dump body arrangement 20.

While not explicitly illustrated in the Figures, it should be noted that the support frame 24 typically comprises a pair of front hydraulic supports 36 and a pair of intermediate supports 34. Further, the pair of the front hydraulic supports 36 are arranged spaced apart in the transverse direction T. Analogously, the pair of intermediate supports 34 are arranged spaced apart in the transverse direction T. Also, as is shown in e.g. FIG. 1, the rear pivot connection, the intermediate support(s) and the front hydraulic support(s) are here arranged on an upper surface of the support frame, i.e. the surface of the support frame normally facing the dump body when the dump body rests on the intermediate support(s) and the front hydraulic support(s). By way of example, the intermediate support(s) and the front hydraulic support(s) are typically fixedly attached to the upper surface of the support frame.

In addition, the dump body is here tiltable by means of a pair of tilting cylinders, for example hydraulic cylinders, which extends between the dump body 22 and the support frame 24. The tilting cylinders may be part of a so-called hoist device 46. By way of example, the dump body is controllable to move between a fully raised position and a fully lowered position resting upon the support frame 24, as also illustrated in FIG. 1. As the dump body 22 rotates into the fully raised position, the dump body may dump and disperse some or all materials or a load from within the dump body 22. As such, the dump body 22 defines a material dispersal device of the machine. The hoist device may be actuated to carry out a reverse operation in which the dump body 22 is lowered from the fully raised position back to the fully lowered position. In the example illustrated in FIG. 1, the hoist device 46 comprises a pair of hydraulic cylinders arranged on each longitudinal side of the dump body 22.

Figure 2:
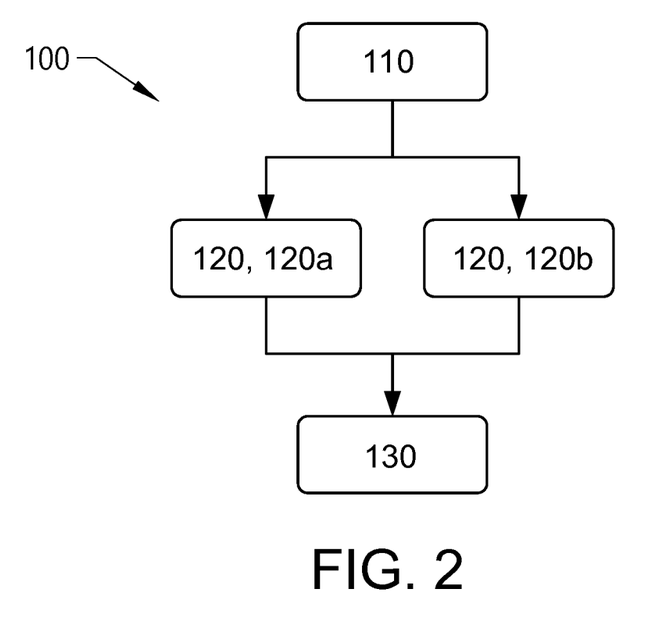
FIG. 2 is a flow-chart of a method according to an example embodiment of the present invention, in which the method comprises a number of steps for determining a status of an intermediate support of a dump body arrangement in FIG. 1.
Figure 3:
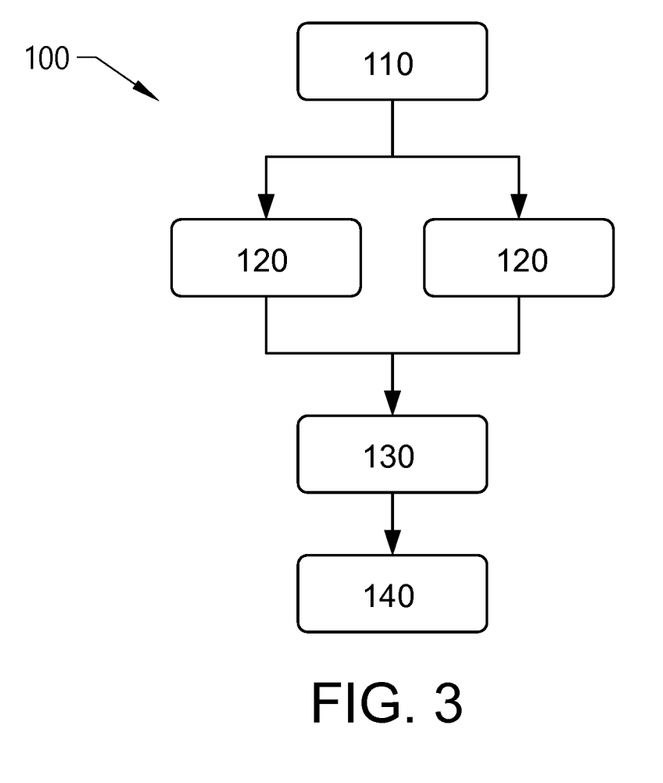
FIG. 3 is a flow-chart of a method according to another example embodiment of the present invention.

Furthermore, the articulated hauler in this example comprises the control unit 60 configured to perform any one of a number of steps of the method as described herein in relation to the example embodiments illustrated in FIGS. 2 and 3. The control unit 60 is here a part of the main electronic control unit for controlling the articulated hauler and various parts of the articulated hauler. In particular, the control unit 60 is arranged in communication with the hydraulic cylinder 36. As mentioned above, the hydraulic cylinder comprises means such as a pressure sensor for monitoring the fluid pressure in the front hydraulic cylinder 36. The pressure sensor is arranged to monitor the pressure in the hydraulic cylinder at various operational conditions. The value of the monitored hydraulic pressure in the front hydraulic cylinder 36 is subsequently transferred to the control unit 60 for further processing according to the example embodiments of the method as described herein.

In accordance with the example embodiments of the method, the front hydraulic support allows for initiating and performing a test sequence to evaluate the status of the intermediate support and to identify any type of wear of the intermediate support. Such a test sequence can be set up making use of the hydraulic pressure p in the hydraulic support and/or data from the angular sensor 39. One example embodiment of a method 100 according to the present invention is illustrated in FIG. 2.

The status of the intermediate support is determined when the dump body is empty. Further, the test sequence of determining the status of the intermediate status is initiated when the control unit receives an indication that the hydraulic support changes between a load-free state and a loaded state relative the dump body. The change of the state of the hydraulic support is obtained by either lowering the hydraulic support or raising the hydraulic front support, as described in relation to FIG. 1. The following description of the example embodiment as illustrated in FIG. 2 will be described when the hydraulic support changes from the loaded state to the load-free state. This is done by lowering the front hydraulic support away from the dump body until the dump body is not in contact with the hydraulic support, but still supported by the intermediate support. That is, the front hydraulic support is lowered until the pressure (or force) in the front hydraulic support corresponds to a non-loaded state. In the non-loaded state, or load-free state, of the front hydraulic support, the force affecting the front hydraulic support in the vertical direction is generally zero. This means that the load from the dump body is primarily transferred to the support frame via the intermediate support and via the rear pivot point. At this stage, the control unit receives, 110, a signal indicating that the front hydraulic support is in the load-free state relative the load of the dump body, i.e. a state in which the hydraulic support is not exposed to a load relating from the dump body. The signal indicating the load-free state may as an example be transmitted from the front hydraulic support and received at the control unit. In this context, it is to be noted that the control unit typically contains data relating to the deadweight of the dump body and also data on the level of the hydraulic pressure in the front hydraulic cylinder when there is no payload in the dump body. Accordingly, the control unit can determine that the hydraulic support is in the load-free state by comparing the prevailing hydraulic pressure in the front hydraulic support with a predefined hydraulic pressure for an empty dump body. It should be noted that the hydraulic pressure of the front hydraulic support when the dump body is empty is provided by the deadweight of the dump body.

If the hydraulic support is not in the load-free state relative the load of the dump body, the method may set the hydraulic support in a load-free state by emptying the dump body, lowering the dump body in contact with the supports, and then further lowering the front hydraulic support out of contact with the dump body, as described above.

Subsequently, when the hydraulic support is in the load-free state, the method performs the step 120 of determining 120a the angle α1 of the dump body relative the support frame. The angle α1 is determined as described above in relation to FIG. 1. Accordingly, the control unit 60 is typically also arranged in communication with the angle sensor 39. The angle sensor is arranged to monitor the position (i.e. the angle) of the dump body relative the support frame of the dump body arrangement. The value of the monitored angle is communicated to the control unit 60 for further processing according to the example embodiments of the method as described herein. By way of example, step 120 comprises to determine 120a the angle α1 of the dump body relative the support frame when the hydraulic support is in the load-free state.

In step 130, the control unit determines the wear of the intermediate support by comparing the determined angle with a corresponding threshold. If the determined angle is above the threshold, the control unit determines that the intermediate support has been exposed to excessive wear. In this example, the step of determining the angle of the dump body relative the support frame comprises receiving data indicating a value of the angle. The value of the angle is determined by the angle sensor arranged at the rear pivot point 32, as described above in relation to FIG. 1. Alternatively, the value of the angle is determined from data containing the height h of the front hydraulic support 36 as measured when the front hydraulic support is in the load-free state.

To this end, a larger angle compared to a previous measurement of the angle at a previous occasion typically indicates an increase in wear of the intermediate support. The previous measured angles at various occasions may be transferred and stored in the control unit. It may also be possible that the determined angle is compared with an angle range indicative of an acceptable level of the angle, i.e. indicative of an acceptable level of wear of the intermediate support.

Alternatively, or in addition, the wear of the intermediate support can be determined by measuring the pressure in the hydraulic support, as described above in relation to FIG. 1, when the hydraulic support changes from the load-free state to the loaded state relative the dump body. Accordingly, step 110 here comprises receiving a signal indicative of the change from the load-free state to loaded state of the front hydraulic support relative the dump body. The loaded state of the front hydraulic support generally refers to a position of the front hydraulic support when the front hydraulic support raised in contact with the dump body to support the dump body.

Moreover, step 120 here comprises determining 120b a hydraulic pressure p in the hydraulic support when the front hydraulic support is raised into the loaded-state relative the dump body. The pressure is measured just when the front hydraulic support contacts the dump body.

Further, in step 130, the control unit determines the status of the intermediate support by comparing the determined hydraulic pressure with a corresponding threshold. By way of example, the determined status of the intermediate support is indicative of the wear of the intermediate support. As such, if the determined hydraulic pressure of the hydraulic support is above the corresponding threshold, the control unit determines that the intermediate support has been exposed to excessive wear. To this end, an increase in the hydraulic pressure of the front hydraulic support, i.e. the front hydraulic cylinder, compared to a predefined and acceptable hydraulic pressure of the front hydraulic support (when it is in the loaded state) typically indicates an increase in wear of the intermediate support. If the wear of the intermediate support is critical, i.e. non-acceptable, the operator may typically be informed of the determined status and eventually recommended to carry out service of the dump body arrangement, replace the intermediate support with a fresh intermediate support or any other suitable service for the given purpose. It may also be noted that determined hydraulic pressure of the front hydraulic support may be compared with previous measures hydraulic pressures of the front hydraulic support at various occasions. The previous measured hydraulic pressures of the hydraulic support at various occasions may be transferred and stored in the control unit.

Alternatively, or in addition, the wear of the intermediate support can be determined by determining an angle α2 of the dump body relative the support frame when the hydraulic support is in the loaded state. The angle α2 is determined as described above with the exception that the angle α2 is determined in the loaded state of the front hydraulic support rather than in the load-free state.

It is also conceivable that step 120 comprises a combination of all alternatives of determining 120b the hydraulic pressure and determining 120a the angles of the dump body relative the support frame. However, such combination of the method steps is only optional, and not strictly required.

In a further example embodiment of the method, as illustrated in FIG. 3, the method additionally comprises a step 140 of providing a need-to-service indication to an operator if any one of the determined angles and determined hydraulic pressure of the hydraulic support is above the corresponding threshold. Optional, the method also comprises the steps of monitoring the hydraulic pressure in the hydraulic support and indicating a dump body overload if the monitored hydraulic pressure exceeds another (a second) threshold.

Moreover, if the determined wear is above the second threshold, a lowering of the front hydraulic support is performed until the hydraulic pressure in the hydraulic support is within a permissible hydraulic pressure range.

Thanks to the example embodiments of the present invention, there is provided an improved method for determining a status of an intermediate support of a dump body arrangement, in which wear and creep of the intermediate support can be identified. As described herein, this is at least partly provided by determining any one of the hydraulic pressure of the front hydraulic support and the angle of the dump body relative the support frame of the dump body arrangement when the dump body of the articulated hauler is in the unloaded state.

In all example embodiments as described herein, the steps of the method are typically performed by the control unit 60 during use of dump body arrangement by the working machine. However, the steps of the method may likewise be performed when the working machine is in a non-operational state or not actively performing an operation at construction site. Thus, the control unit is configured to perform any one of the steps of any one of the example embodiments as described above in relation to the FIGS. 1-3.

It should also be noted that the method described above in relation to FIG. 3 may include any other features, aspects or steps as described in relation to the method as described in relation to FIG. 2, at least as long as there are no contradictions between the steps of the example embodiments.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions Although the figures may show a sequence, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be noted that any numerical designations, such as "first" or "second" are illustrative only and are not intended to limit the scope of the invention in any way. It is also to be understood that the present invention is not limited to the embodiments described above and illustrated in the drawings; rather, the skilled person will recognize that many changes and modifications may be made within the scope of the appended claims.

The invention claimed is:

1. A method for determining a status of an intermediate support of a dump body arrangement being comprised in a working machine, the dump body arrangement comprises: a support frame, a dump body for receiving a load and pivotally attached to the support frame at a rear pivot point, a hydraulic support for raising and lowering a front part of the dump body, wherein the intermediate support is arranged between the hydraulic support and the rear pivot point to support the dump body, wherein the method comprises:

receiving a signal indicating that the hydraulic support changes between a load-free state and a loaded state relative to the dump body;

if the hydraulic support changes from the loaded state to the load-free state relative to the dump body, determining, when the hydraulic support is in the load-free state, a first angle of the dump body relative to the support frame;

if the hydraulic support changes from the load-free state to the loaded state relative to the dump body, determining, when the hydraulic support is in the loaded state, a second angle of the dump body relative to the support frame and a hydraulic pressure in the hydraulic support;

determining the status of the intermediate support that is indicative of wearing of the intermediate support by comparing any one of the determined angles and the determined hydraulic pressure with a corresponding threshold; and providing a need-to-service indication to an operator if any one of the determined angles and determined hydraulic pressure of the hydraulic support is above the corresponding threshold.

2. The method according to claim 1, wherein the method further comprises determining that the intermediate support is exposed to excessive wear if any one of the determined angles and determined hydraulic pressure of the hydraulic support is above the corresponding threshold.

3. The method according to claim 1, wherein determining anyone of the first and the second angles of the dump body relative to the support frame comprises receiving data indicating a corresponding value of the first and the second angles.

4. The method according to claim 3, wherein the values of the first and the second angles is determined by an angle sensor arranged at the rear pivot point.

5. The method according to claim 3, wherein the value of the first angle is determined from data containing the hydraulic support height as measured when the hydraulic support is in the load-free state, and/or wherein the value of the second angle is determined from data containing the hydraulic support height as measured when the hydraulic support is in the loaded state.

6. The method according to claim 1, wherein the hydraulic support movement is restricted in extent to avoid that load contained in the dump body is dispersed from the dump body.

7. The method according to claim 1, wherein the intermediate support is arranged longitudinally adjacent and substantially vertically above a rear axle of the working machine.

8. The method according to claim 1, further comprises monitoring the hydraulic pressure in the hydraulic support and indicating a dump body overload if the monitored hydraulic pressure exceeds another threshold.

9. The method according to claim 1, further comprises lowering the hydraulic support until the hydraulic pressure in the hydraulic support is within a permissible hydraulic pressure range.

10. The method according to claim 1, further comprises a control unit in communication with the working machine, the control unit being configured to perform any one of the method steps.

11. A non-transitory computer readable medium comprises a computer program that is comprising program code for performing the method steps of claim 1, when said program is run on a computer.

12. A non-transitory computer readable medium carries a computer program that is comprising program means for performing the method steps of claim 1, when said program means is run on a computer.

13. A dump body arrangement for a working machine, the dump body arrangement comprises: a dump body for receiving a load and pivotally attached to a support frame at a rear pivot point, a hydraulic support for raising and lowering a front part of the dump body, an intermediate support for supporting the dump body, the intermediate support being arranged between the hydraulic support and the rear pivot point, and a control unit, wherein the control unit is configured:
  to receive a signal indicating that the hydraulic support changes between a load-free state and a loaded state relative to the dump body;
  to determine, if the hydraulic support changes from the loaded state to the load-free state relative to the dump body and when the hydraulic support is in the load-free state, a first angle of the dump body relative to the support frame;
  to determine, if the hydraulic support changes from the load-free state to the loaded state relative to the dump body and when the hydraulic support is in the loaded state, a second angle of the dump body relative to the support frame and a hydraulic pressure in the hydraulic support;
  to determine the status of the intermediate support that is indicative of wearing of the intermediate support by comparing any one of the determined angles and the determined hydraulic pressure with a corresponding threshold; and
  providing a need-to-service indication to an operator if any one of the determined angles and determined hydraulic pressure of the hydraulic support is above the corresponding threshold.

14. A working machine comprises an articulated hauler, which is comprising a dump body arrangement according to claim 13.

* * * * *